Patented Feb. 26, 1924.

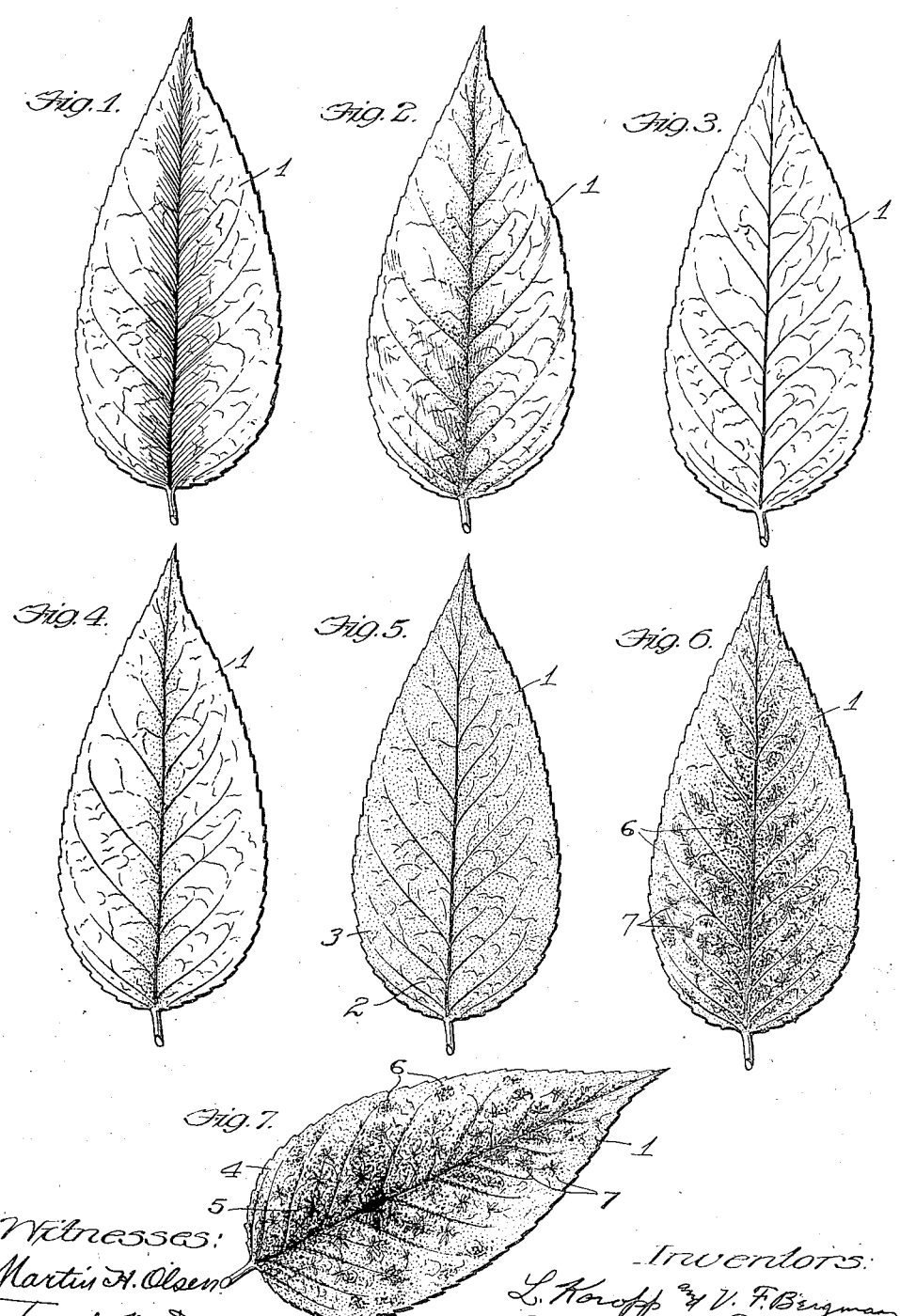

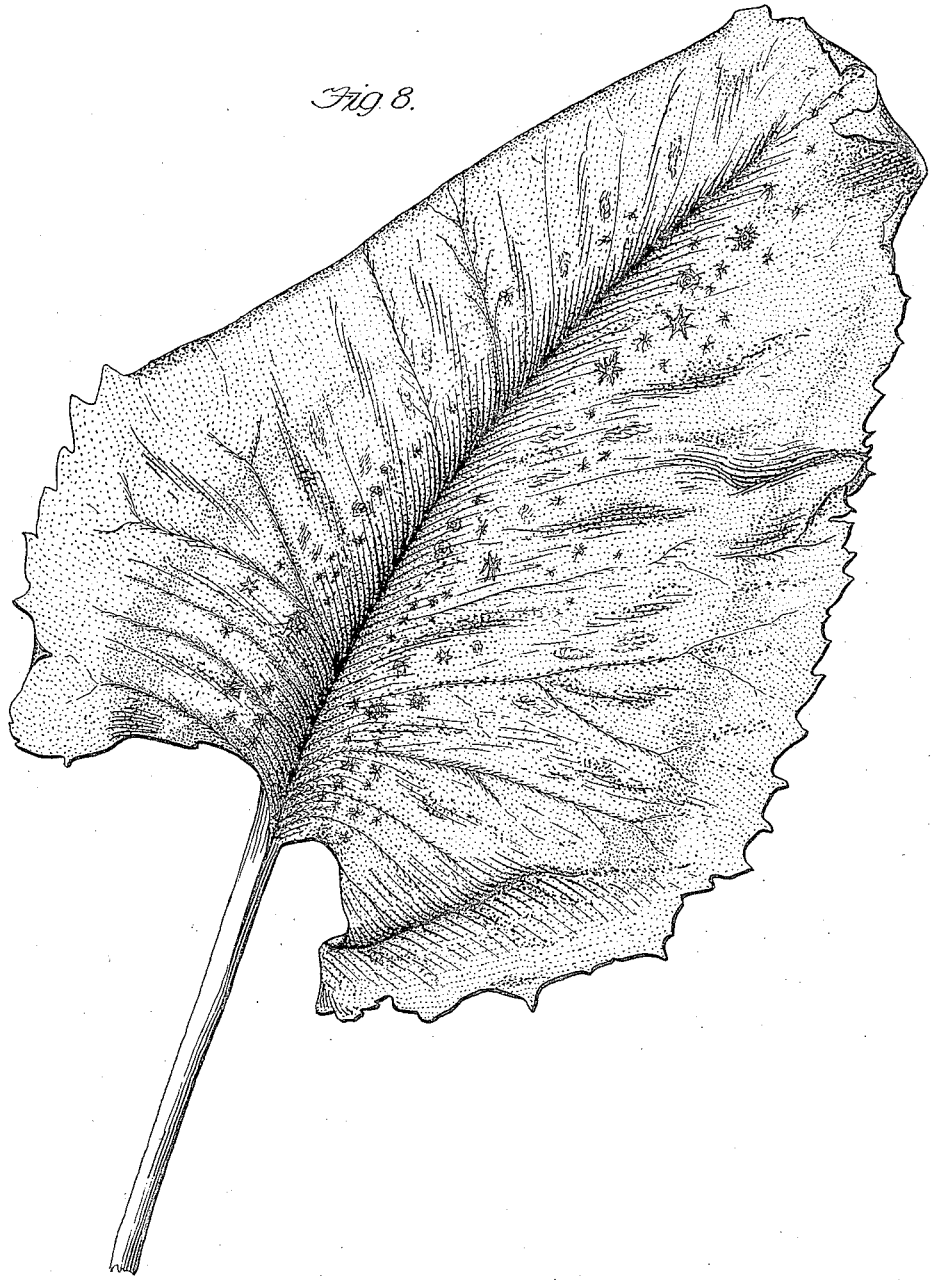

1,484,656

UNITED STATES PATENT OFFICE.

LEOPOLD KOROPP AND VICTOR F. BERGMAN, OF CHICAGO, ILLINOIS.

PLANT PRODUCT.

Application filed August 2, 1919. Serial No. 314,812.

*To all whom it may concern:*

Be it known that we, LEOPOLD KOROPP and VICTOR F. BERGMAN, citizens of the United States of America, and residents of Chicago, county of Cook, and State of Illinois, have invented certain new and useful Improvements in Plant Products, of which the following is a specification.

This invention relates mainly to decorative means and products, and especially to natural plants in a form adapted for preserving indefinitely.

The main objects of the invention are to provide natural plants or parts thereof in such condition and form as to retain their natural character and appearance respecting color, texture, pliability, and other physical attributes; to provide a plant product, adapted especially for decorative purposes, largely retaining its chief natural physical characteristics and appearance, and adapted to lend itself readily to supplemental decorative treatment; to provide a dry plant product having largely the natural appearance of the living plant and also having generally far more pliability and strength to resist breakage, tearing and exposure to the air and elements than untreated plants; to provide such a plant product, preferably of weather-proof character, having artificial decorative features added thereto, adapting it for use in window decoration, trimming millinery goods, et cetera; and to provide natural plant exhibits in a permanent form best adapted to display the natural form and color characteristics of the plants, as for decorative and educational purposes.

Illustrative embodiments of this invention are shown in the accompanying drawings, in which—

Fig. 1 represents a leaf in its natural growing condition.

Fig. 2 represents said leaf after it has been dried in its natural shape and become somewhat wrinkled thereby.

Fig. 3 represents said leaf after it has been soaked in a softening and preserving solution.

Fig. 4 represents said leaf after it has again been dried to a greater or less extent.

Fig. 5 represents said leaf after it has been sprayed with a flat coloring material, as paint, disposed rather thin in places.

Fig. 6 is a view of said leaf after it has been sprinkled with colored pigment in the form of dust, chips, bronze powder, floss, or the like, following the paint, or paint and varnish.

Fig. 7 is a view of the leaf of Fig. 4 after treatment with colored sprays of different colors to produce a mixed or variegated coloring and also sprinkled in places with dust, chips and floss.

Fig. 8 represents a lotus leaf which has been treated and artificially decorated.

Fig. 9 shows a stock of herd's-grass or timothy.

Fig. 10 shows a grass plume.

Fig. 11 shows another kind of grass plume.

Fig. 12 shows a branch of goldenrod.

The plant or natural growth to be treated is gathered or harvested in whatever stage of its development may be desired for preservation. It is to be understood, however, that the more advanced and matured specimens are preferable for general decorative purposes, owing to their greater natural beauty and adaptability to retain their original form, though for some purposes greater flexibility is desirable, in which case young growing plants are preferable.

The plants are first dried, preferably as soon as possible after gathering. If necessary, they may be kept in this condition for a time, but it is preferable to treat them soon with a softening and preserving composition. For this purpose we prefer the solution described in our said application Serial No. 312,064, the essential components being glycerine, water, and formalin in the proportion preferably of ten, eighty-nine and one respectively.

The dried plant or part, which is usually stiff and hard, is soaked in this fluid until the pores and cells have all become saturated with the solvent, glycerine and the accompanying preservative, formalin. The glycerine somewhat softens the texture of the fibers, especially if the plant was young and growing when gathered, and so renders it pliable. The formalin enters the pores with the glycerine and so permeates the whole plant and renders it antiseptic and decay-proof.

Long fiber material, such as ripening grains, grasses and the like, do not require so much soaking as fine texture materials, such as leaves, flowers, et cetera; ten hours being about right for the former and fourteen to sixteen hours for the latter. The more solid materials, such as hard stems and dead weeds of some kinds, require about twenty-four hours.

The material treated is placed in such manner as to drain off the surplus liquid after sufficient soaking, and is also permitted to dry off on the surface, ready for the next step.

The primary function of the glycerine is to soften the texture of the dried leaf or other object, and to restore the same to its natural, soft or flexible state, capable of withstanding jars, bending, crumpling and the like. Being transparent it has little or no effect on the natural coloring of the plant. The natural gums and resins are presumably all dissolved by the glycerine and so caused to become substantially an integral part of the solution. This permits the glycerine and formalin to penetrate every pore of vegetable tissue.

The function of the powerfully antiseptic formalin is to preserve the structure of the plant from decay and from insects, et cetera.

When the foregoing fluid composition is properly used in the process of treating the objects to be preserved, said object retains substantially all of its natural physical attributes respecting form, color, pliability, and resilience, so that it is especially adapted to serve either as a botanical specimen, for educational purposes, or as an article of decorative character, whether additional coloring or decorative features be added or not. Generally the addition of such features is desirable, as will be more fully set forth.

Referring further to the product illustrated by said drawings, Figs. 1 to 7, the leaf 1, following the foregoing preliminary treatment, may have the first coloring matter, preferably a flat oil-paint, so applied as to give either a solid uniform appearance or preferably a shaded thick and thin appearance, as indicated at 2 and 3. Moreover, a plurality of blending shades or colors merging one into another may be applied, ranging from a light color, indicated at 4, to a darker color, indicated at 5. This much of the treatment is basic and applies to all plants including leaves, grasses, mosses, ferns, and such flowers as are capable of preservation by the means herein set forth, though in most such cases the flat colors are arranged for solid effect. Generally the oil colors are far better adapted for plant decoration than analines or water colors.

If further treatment is to be accorded, a coating of adhesive, preferably in the form of high-grade spar varnish, is applied which serves to protect the flat colors and give luster thereto, and also to prevent drying out and to retain the subsequently applied materials. Brilliant spotted or local effects may be produced by applying powdered pigment, either in spots as shown at 6, or, if preferred, the pigment may be distributed somewhat uniformly or in zones to suit the fancy of the decorator. Still more delicate effects may be produced by means of applying floss, as indicated at 7, so as to produce a delicate fuzzy or hairy appearance such as occurs naturally on some leaves, especially on the under side. Chips, granules, crystals, and crumbs of various character may also be applied, as will be apparent, in place of or in conjunction with the powder 6.

The paint and varnish, either each by itself or combined, serve to seal the pores and protect the glycerine against change in moisture content.

Fig. 8 shows a wild leaf which has been treated and decorated with shaded paint sprays, amorphous pigment spots, floss and granular crystals of different colors arranged in zones shading from a dark midrib zone to much lighter zones toward the edges. These leaves, which are rather suggestive of the tropics, are to be found plentifully, growing wild on the prairies in the North Central States. They are of large size and attractive shape, and when treated are remarkably tough and durable. These leaves typify a great variety of large leaves adapted for the purpose of this invention.

The grasses shown in Figs. 9, 10, and 11 typify a multitude of similar plants, including grains, all of which are especially adapted for ready treatment, either with or without artificial decoration. The heads, either in flower or when filled with ripening seed, may with most beautifying effect be treated with appropriate pigments.

The branch of goldenrod shown in Fig. 12 is typical of the many weeds and other plants, especially of the flowering kind, adapted for use under this invention. The flowering parts or tips may be variously colored and tinted to suit the fancy of the designer or interior decorator or to harmonize with any set color scheme. Weeds and other plants having seed pods are very useful in this connection, especially if of odd or fantastic shape.

We find that all liquid coloring may as a rule be applied best by means of a spray brush, though some of the plain and coarser growths may be dipped directly into a thin paint. In the latter case, the excess paint may be drained off by suspending the plant over a suitable drip-pan as will be understood. Delicate branchy plants, however, cannot be dipped, as the parts would mop together, spraying being necessary.

The dust-pigments, chips, floss and the like may well be dusted on by means of a pepper-shaker or such means, or in some instances a pneumatic fan "gun" may be used to blow on the powders, et cetera.

Some of the granular coloring materials which may be used with good effect are particles of metal such as chips or filings and the like, oxides of metal, diamond dust, slag and natural sands, some of which latter occur naturally in strata of variegated colors.

Various other kinds of comminuted solid coloring materials may also be used, as for instance, starch, flour, meal, and certain kinds of floss. Some of the flosses serve well to produce desirable flocculent effects. Certain solid pigments may be more or less soluble in the wet adhesive and may accordingly run somewhat therein, as for instance some of the amorphous powders and oxides.

There is great utility of this invention in the decorative art, especially for store window and general interior decorations, stage scenery, landscape and garden effects, and in the field of millinery design. The product is not only cheap and easy to produce, but is durable and capable of most rich and pleasing effects, and is moreover far truer to the natural beauties of nature than any artificial decoration can be.

Although several specific embodiments or modifications of this invention are herein set forth, it will be understood that no attempt has been made to show all practical and useful embodiments of the invention, and that some of the details of the process and product set forth may be altered or omitted without departing from the spirit of this invention as defined by the following claim.

We claim:

A decorative product comprising a natural plant part having a varnish-like coating with particles of pigment severally more or less dissolved and spread therein and with the remainder set firmly in the coating.

Signed at Chicago this 12 day of July, 1919.

LEOPOLD KOROPP.
VICTOR F. BERGMAN.